(12) United States Patent
Stefanatos et al.

(10) Patent No.: US 12,088,462 B2
(45) Date of Patent: Sep. 10, 2024

(54) TECHNIQUES FOR TDM-BASED COEXISTENCE OF V2X TECHNOLOGIES

(71) Applicant: QUALCOMM Incorporated, San Diego, CA (US)

(72) Inventors: Stelios Stefanatos, San Diego, CA (US); Shailesh Patil, San Diego, CA (US); Marco Papaleo, Bologna (IT); Michael Alexander Ruder, Pommelsbrunn (DE); Tien Viet Nguyen, Bridgewater, NJ (US)

( * ) Notice: Subject to any disclaimer, the term of this patent is extended or adjusted under 35 U.S.C. 154(b) by 224 days.

(21) Appl. No.: 17/249,922

(22) Filed: Mar. 18, 2021

(65) Prior Publication Data

US 2021/0297314 A1 Sep. 23, 2021

Related U.S. Application Data

(60) Provisional application No. 62/992,748, filed on Mar. 20, 2020.

(51) Int. Cl.
*H04L 41/0816* (2022.01)
*H04J 3/14* (2006.01)
(Continued)

(52) U.S. Cl.
CPC .......... *H04L 41/0816* (2013.01); *H04J 3/14* (2013.01); *H04J 3/1694* (2013.01); *H04W 4/40* (2018.02);
(Continued)

(58) Field of Classification Search
CPC ............ H04L 41/0816; H04L 43/0876; H04L 5/0091; H04L 5/22; H04L 5/0053;
(Continued)

(56) References Cited

U.S. PATENT DOCUMENTS

2013/0294412 A1* 11/2013 Wang ................ H04W 72/1215
370/328
2016/0100400 A1* 4/2016 Lu ..................... H04W 56/0015
370/336

(Continued)

FOREIGN PATENT DOCUMENTS

EP           3582562 A2    12/2019
WO        2018009886 A1     1/2018
WO    WO-2021139601 A1 *   7/2021

OTHER PUBLICATIONS

ETSI: "Road ITS Coexistence Study", IEEE Draft, Draft LS Out on ITS Mandate For TC to RT-ITS-ERM Annex2_BMWI, IEEE-SA, Piscataway, NJ USA, vol. 802.11 ETSI ITS, Aug. 10, 2018 (Aug. 10, 2018), pp. 1-38, XP068163586, 38 Pages.

(Continued)

*Primary Examiner* — Peter P Chau

(57) ABSTRACT

Aspects described herein relate to methods for TDM based co-existence of V2X technologies. A method may comprise receiving a time division multiplexed configuration that is determined based on a distribution of a plurality of technologies in a communication system, the distribution corresponding to a traffic load of each technology and transmitting in accordance with channel access methods of one of the plurality of technologies during a resource allocated according to the received TDM configuration. In an aspect, each of the plurality of technologies operate in accordance with channel access methods defined for each technology.

15 Claims, 7 Drawing Sheets

(51) Int. Cl.
  *H04J 3/16* (2006.01)
  *H04W 4/40* (2018.01)
  *H04W 24/08* (2009.01)
  *H04W 28/02* (2009.01)

(52) U.S. Cl.
  CPC ....... *H04W 24/08* (2013.01); *H04W 28/0226* (2013.01)

(58) Field of Classification Search
  CPC ........... H04J 3/14; H04J 3/1694; H04W 4/40; H04W 24/08; H04W 28/0226; H04W 4/50; H04W 48/16; H04W 72/1215; H04W 16/14; H04W 72/02; H04W 72/0446
  See application file for complete search history.

(56) References Cited

U.S. PATENT DOCUMENTS

2021/0014656 A1\* 1/2021 Mueck .................... H04W 4/40
2022/0287083 A1\* 9/2022 Gomes Baltar ... H04W 74/0808

OTHER PUBLICATIONS

Intel Corporation: "LTE-V2V Coexistence with DSRC Technology", 3GPP Draft, 3GPP TSG RAN WG1 Meeting #87, R1-1611924 Intel—V2V DSRC, 3rd Generation Partnership Project (3GPP), Mobile Competence Centre, 650, Route Des Lucioles, F-06921 Sophia-Antipolls Cedex, France, vol. RAN WG1, No. Reno. USA, Nov. 14, 2016-Nov. 18, 2016, Nov. 13, 2016 (Nov. 13, 2016), XP051175890, pp. 1-8.
International Search Report and Written Opinion—PCT/US2021/023137—ISA/EPO—Jul. 20, 2021.

\* cited by examiner

TECHNIQUES FOR TDM-BASED COEXISTENCE OF V2X TECHNOLOGIES

CLAIM OF PRIORITY UNDER 35 U.S.C. § 119

The present Application for Patent claims priority to Provisional Application No. 62/992,748 entitled "TECHNIQUES FOR TDM-BASED COEXISTENCE OF V2X TECHNOLOGIES" filed Mar. 20, 2020 and assigned to the assignee hereof and hereby expressly incorporated by reference herein.

FIELD OF THE DISCLOSURE

Aspects of the present disclosure generally relate to wireless communication and particularly to techniques for time division multiplexed based coexistence of V2X technologies.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, bandwidth, transmit power, and/or the like). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

Some wireless communication networks include vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-everything or vehicle-to-anything (V2X) communications. Technologies that support V2X communications include for instance, intelligent transportation system or intelligent transport systems (ITS)-G5 (G5 is derived from the frequency band 5.9 GHz upon which it was designed to operate)/dedicated short-range communications (DSRC) and LTE/NR. DSRC protocol was developed in the United States and the ITS-G5 protocol was developed by the European Telecommunications Standards Institute (ETSI). These standards are based on the IEEE 802.11p access layer developed for vehicular networks. Multiple technologies may be called to operate in the same ITS spectrum.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes determining a time division multiplexed (TDM) configuration based on a distribution of a plurality of technologies in a communication system, the distribution corresponding to a traffic load of each technology, and transmitting the TDM configuration to an apparatus in the communication system.

In another example, a method for wireless communication is provided. The method includes receiving a time division multiplexed (TDM) configuration that is determined based on a distribution of a plurality of technologies in a communication system, the distribution corresponding to a traffic load of each technology, and transmitting in accordance with channel access methods of one of the plurality of technologies during a resource allocated according to the received TDM configuration.

In another example, an apparatus for wireless communication is provided that includes a transceiver, a memory configured to store instructions, and one or more processors communicatively coupled with the transceiver and the memory. The one or more processors are configured to determine a time division multiplexed (TDM) configuration based on a distribution of a plurality of technologies in a communication system, the distribution corresponding to a traffic load of each technology, and transmit the TDM configuration to an apparatus in the communication system.

In another example, an apparatus for wireless communication is provided. The apparatus includes a transceiver, a memory configured to store instructions, and one or more processors communicatively coupled with the transceiver and the memory. The one or more processors are configured to receive a time division multiplexed (TDM) configuration that is determined based on a distribution of a plurality of technologies in a communication system, the distribution corresponding to a traffic load of each technology, and transmit in accordance with channel access methods of one of the plurality of technologies during a resource allocated according to the received TDM configuration.

In further examples, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
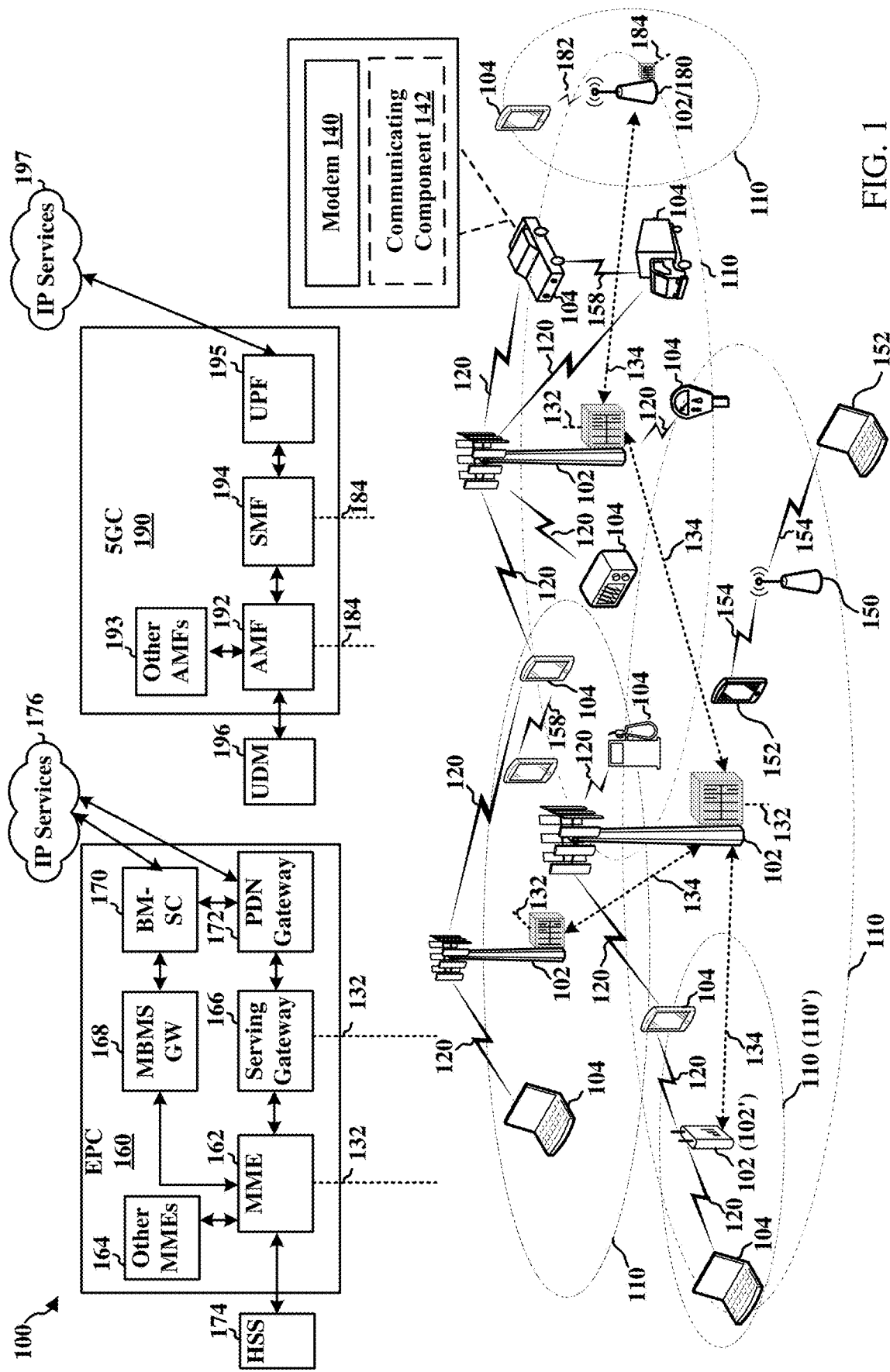
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to TDM-based co-existence of V2X technologies. As such, the concepts are generally described herein with respect to D2D communication technologies. For example, D2D communication technologies can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything or vehicle-to-everything (V2X) communications. In V2X communications, vehicle-based communication devices can communicate with one another and/or with infrastructure devices over a sidelink channel. Continued support and implementation of V2X communications is provided in fifth generation (5G) new radio (NR) communication technologies, long term evolution (LTE), intelligent transportation system (ITS)-G5/ dedicated short-range communications (DSRC). The DSRC protocol was developed in the United States and the ITS-G5 protocol was developed by the European Telecommunications Standards Institute (ETSI). These standards are based on the IEEE 802.11p access layer developed for vehicular networks. Though aspects are generally described herein in terms of D2D/V2X communications, the concepts and techniques can be similarly applied more generally to substantially any type of wireless communications.

Vehicles from different manufacturers may use different technologies (e.g., ITS-G5/DSRC or LTE/NR) and there may not be a consensus as to which technology is preferred, at least initially, so vehicles from different manufacturers end up using different technologies. In an aspect, these technologies may be fundamentally incompatible and a co-existence problem arises, in scenarios where both technologies are called to operate in the same ITS spectrum. Allowing both technologies to operate on the same time and/or frequency resources may result in interference conditions and performance degradation.

Accordingly, aspects described herein relate to enabling efficient resource sharing between different technologies that coexist on the same spectrum or channel. Disclosed examples include TDM based coexistence schemes. In disclosed examples, these schemed may be aided by energy sensing performed by vehicle on board units (OBUs) or roadside units (RSUs). In examples, co-existence methods allowe for simultaneous operation of multiple (e.g. two) V2X technologies over a same band.

In aspects, methods include time division multiplexing with time sharing (TDM configuration). Methods are adjusted according to current traffic load experienced by each technology e.g. local traffic conditions or other information such as deployment status for each technology (e.g. wide area deployment status such as city or region or country wide deployment.

In examples discussed in further detail below, in in-coverage scenarios, vehicles may retrieve current TDM configuration from a network, e.g. roadside units (RSUs).

In examples discussed in further detail below, in out of coverage scenarios, exemplary energy sensing methods may be deployed, wherein each vehicle independently adapts its TDM configuration to current traffic conditions. In aspects, in the absence of energy sensing methods, methods to fall back to a default state may be deployed. The described features will be presented in more detail below with reference to FIGS. 1-5.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0) and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below; although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an SI interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHZ unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHZ and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHZ and 30 GHZ, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QOS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat MI) UEs, NB-IOT (also referred to as CAT NB1) UEs, as well as other types of UEs. In the present disclosure, eMTC and NB-IOT may refer to future technologies that may evolve from or may be based on these technologies. For example, eMTC may include FeMTC (further eMTC), eFeMTC (enhanced further eMTC), mMTC (massive MTC), etc., and NB-IOT may include eNB-IoT (enhanced NB-IOT), FeNB-IOT (further enhanced NB-IOT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, referring to the D2D communications described above, where the devices are vehicles or otherwise vehicle-based, the D2D communications between the devices (e.g., over a sidelink channel of communication link 158) can be referred to as V2V communications, which are defined for 3GPP LTE and are being defined for 5G NR. When the vehicles or vehicle-based devices communicate with other infrastructure nodes for the vehicle-based communications (e.g., over the sidelink), this can be referred to as V2I communications. When the vehicles or vehicle-based devices communicate with a base station 102 or other network node (e.g., over a communication link 120), this can be referred to as V2N communications. The collection of V2V, V2I, V2N, and/or vehicle-to-anything else can be referred to as V2X communications. In an example, LTE can support V2X communications (referred to as "LTE-V2X") for safety messages communicated between vehicles and/or from vehicles to infrastructure. 5G NR can also support V2X (referred to as "NR-V2X") for communications related to autonomous driving. For example, sidelink V2X communications may occur in a dedicated portion of spectrum such as the 5.9 GHZ DSRC bandwidth reserved for vehicle communications.

In aspects described herein, UE 104 can include a modem 140 for communicating with other UEs and/or base stations in a wireless network.

Turning now to FIGS. 2-5, aspects are depicted with reference to one or more components and one or more methods that may perform the actions or operations described herein, where aspects in dashed line may be optional. Although the operations described below in FIGS. 3 and 4 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 2:
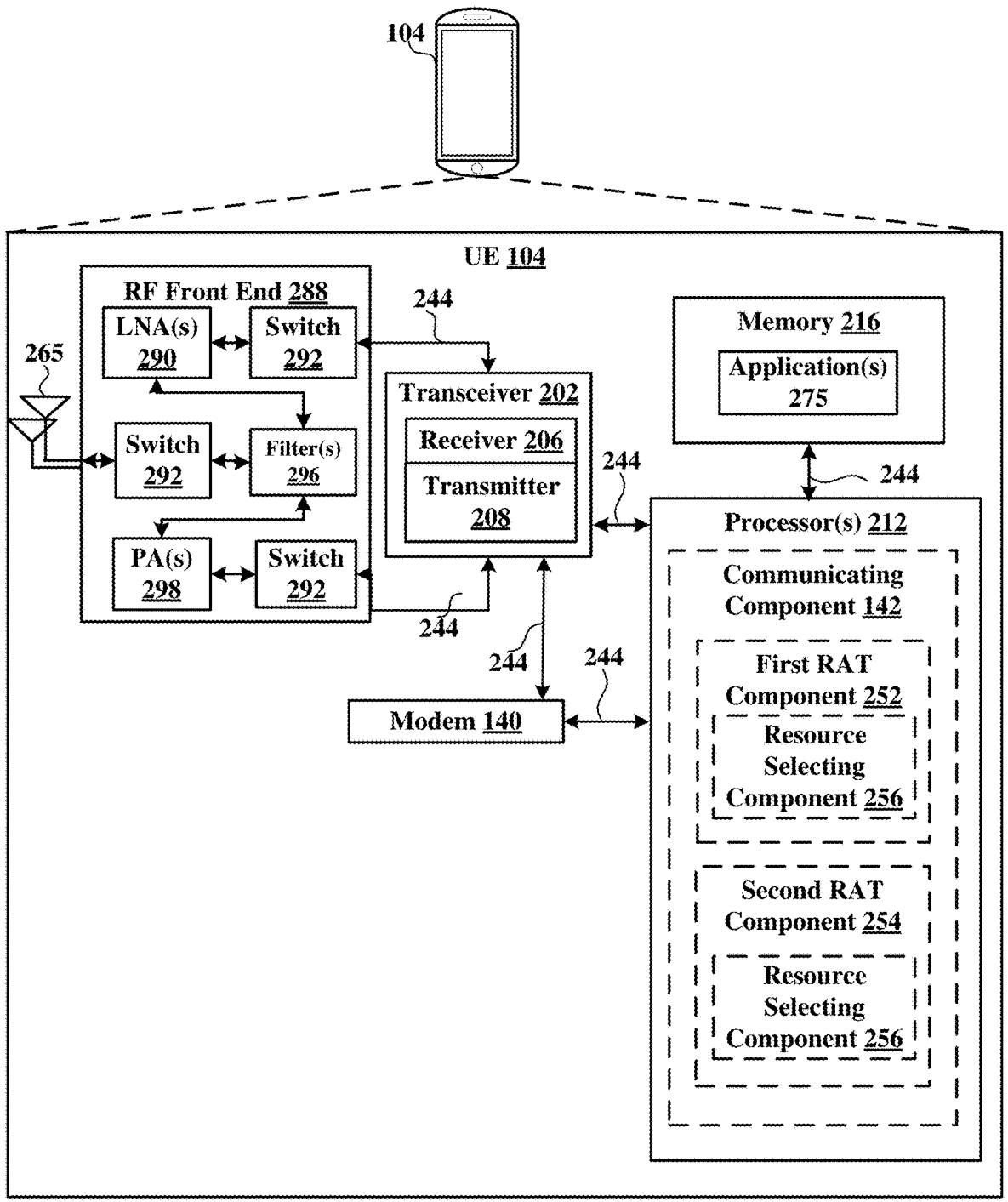
FIG. 2 is a block diagram illustrating an example of a user equipment, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140, a communicating component 142 for transmitting and/or retransmitting communications for multiple RATs in a wireless network, receiving communications for multiple RATs, etc., according to one or more of the functions described herein.

In an aspect, the one or more processors 212 can include a modem 140 and/or can be part of the modem 140 that uses one or more modem processors. Thus, the various functions related to communicating component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with communicating component 142 may be performed by transceiver 202.

Also, memory 216 may be configured to store data used herein and/or local versions of applications 275 or communicating component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 142 and/or one or more of its subcomponents, and/or data associated therewith, when UE 104 is operating at least one processor 212 to execute communicating component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAS) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 142 can optionally include a RAT component 252 for transmitting or receiving (e.g., via transceiver 202) communications (e.g., via transceiver 202).

The RAT component 252 may include a collection of functions, applications, etc. that operate to process communications based on the RAT, operate antennas 265, RF front end 288 components, a respective modem 140, etc. to encode/decode, modulation/demodulate, etc. communications of the RAT, provide a network stack for generating, at various network layers, data units or other constructs to facilitate wirelessly communicating RAT signals, and/or the like.

In an aspect, the processor(s) 212 may correspond to one or more of the processors described in connection with the UE in FIG. 5. Similarly, the memory 216 may correspond to the memory described in connection with the UE in FIG. 5.

As previously mentioned, disclosed examples provide methods and apparatus to efficiently share a common spectrum between different technologies, and in particular between at least two technologies (e.g. ITS-G5 (DSRC) and LTE/NR). Methods and apparatus are disclosed to enable efficient spectrum sharing as blind operation may lead to sub-optimal interference conditions and performance degradation in communication systems.

In disclosed examples, two technologies may be time division multiplexed, whereby certain parts of time are exclusively dedicated to one technology e.g. DSRC transmissions, and other parts of time are dedicated to another technology e.g. LTE V2X transmissions. Each technology operates according to channel access methods and specifications defined for that technology within the time periods exclusively dedicated to that technology. In some examples, user devices may independently determine optimal time division configurations between the respective technologies.

In some co-existence scenarios, for two different V2X technologies on the same spectrum within network coverage or within range of base stations, the base stations may inform the user device of TDM configurations to use. For instance, an LTE device may know a time period when it can transmit and expect to receive LTE signals and DSRC devices may be informed of a time period when it may transmit and expect to receive DSRC signals.

In other co-existence scenarios, user devices may be out of coverage of a network and may have to operate exclusively or independently. Disclosed examples provide methods and apparatus to update a user device of TDM configurations to use when the device is out of network coverage. In some examples, a user device may fall back to a default configuration and may optionally apply an energy sensing methodology to dynamically determine what TDM configuration to use.

Figure 3A:
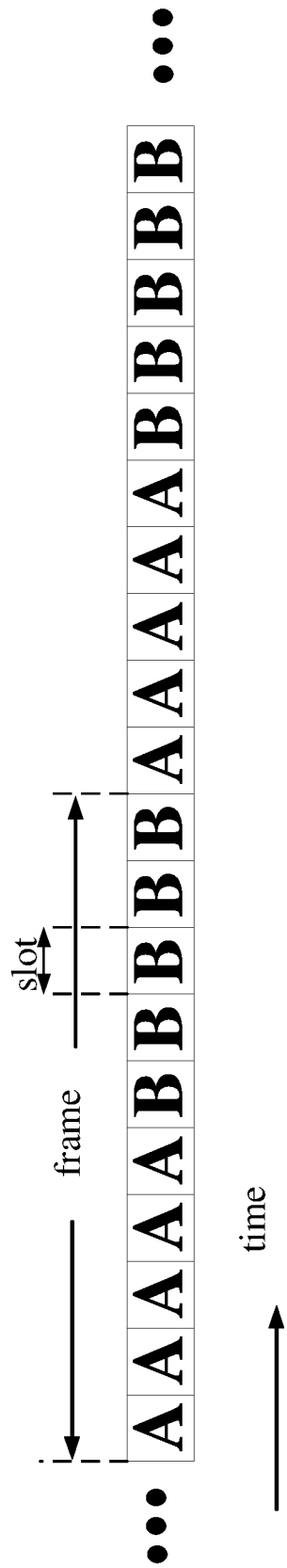
FIGS. 3A and 3B illustrate examples of disclosed embodiments.
Figure 3B:
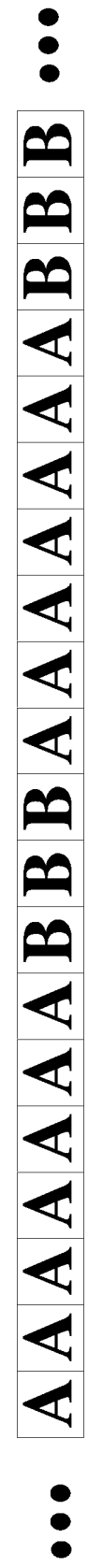

FIGS. 3A and 3B illustrate examples of disclosed embodiments. As illustrated, resources such as time may be time division multiplexed. As illustrated in FIG. 3A, the time resource may be divided into frames, and each frame in turn, may be divided into a number of slots. In this example, each frame is divided into ten slots. In other examples, frames may be divided into any number of slots. Here, each slot corresponds to a particular technology and represents a portion of time for which a particular technology may transmit on the spectrum. For instance, in FIG. 3A, two technologies are represented—technology "A" and technology "B." The first half of the frame, or the first five slots in FIG. 3A are exclusively dedicated to technology "A." Therefore, only devices using technology "A" may transmit during the first 5 time slots depicted in FIG. 3A. Devices using technology "A" may also expect to receive a signal in these slots. For the second half of the frame, only technology "B" devices are allowed to transmit. Technology "B" devices may also expect to to receive signals in these time slots. In examples, technology "A" may refer to DSRC and technology "B" may refer to LTE V2X. In examples, technology "A" may refer to some other V2X technology and technology "B" may refer to yet another V2X technology.

In an aspect of the present example, devices operate according to their respective channel access methods. For example, LTE V2X devices may still use semi-persistent scheduling (SPS) methods within the deployed LTE V2X technology and a DSRC device would still use its own access mechanisms.

In an aspect, respective devices would not attempt to access the channel within the slots that are allocated to the other technology. For instance, for the first half of the frame illustrated in FIG. 3A, technology "A" devices would utilize available tools and procedures defined by technology "A" specifications, as if operating completely independently. Then, operations would stop at a particular point in time according to prescribed TDM configurations. Devices using technology "B" would operate utilizing tools and procedures specified for technology "B" as if operating completely independently. In examples, the TDM configuration or pattern may be repeated in every frame. In some examples, a frame may be a superframe known to both technologies.

In an aspect, slots dedicated to a particular technology are allocated contiguously. For example, as illustrated in FIG. 3A, the first 5 contiguous slots are dedicated to technology "A" and the next 5 contiguous slots are dedicated to technology "B." In examples, random distribution of slots may be considered although contiguous allocation of slots dedicated to the same technology may be preferred.

In aspects, technologies (e.g., technologies A and B as illustrated in FIG. 3A) have a common time reference. In examples, the common time reference is provided by a Global Navigation Satellite System (GNSS). As long as devices have information about the frame division, they may without any interference, transmit over slots allocated to them. In some examples, other time reference systems may be deployed.

In aspects of disclosed examples, at least one guard interval may be introduced at the end of a slot or at the end of slots to account for synchronization inaccuracies. In examples, a guard interval may be used to ensure distinct transmissions do not interfere with one another, or cause overlapping transmissions. A guard interval may be a space between symbols being transmitted and may eliminate intersymbol interference.

In some examples, a TDM pattern of a frame may correspond to, or be proportional to the traffic load of each technology. For instance, assuming a system with two technologies are serving the same amount of traffic, (e.g., roughly equal number of vehicles from each technology are present in the field, serving similar or the same traffic loads) each technology may be assigned half of the total number of slots per frame.

Referring back to FIG. 3A, technology "A" may be allocated half of the available frames and technology "B" may be allocated the other half of the frames.

In aspects of disclosed examples, an overall frame structure may be known to both technologies, e.g. "Technology A" and "Technology B." In examples, the overall frame structure may be referred to as a "superframe." In some examples, e.g. in FIG. 3A, a frame as shown may be referred to as a superframe.

In aspects, a contiguous portion of the superframe timing may be allocated to each technology. In examples, each technology may be allowed to transmit only to its allocated partition. A TDM configuration or pattern may be repeated in every superframe. In examples, slots which are dedicated to each technology may be contiguous. In some examples, a guard interval at the end of each partition may be introduced to account for synchronization inaccuracies. In some scenarios, when one technology dominates the traffic, more TDM slots may be dedicated to that technology as compared to the other technology. Thus, as illustrated in FIG. 3B, if technology "A" dominates traffic, more (seven) slots may be dedicated to technology "A," and fewer (three) slots are dedicated to technology "B." Here, again, the TDM configuration or pattern may be repeated in every frame.

In aspects of disclosed examples the TDM configuration may be considered static or semi-static.

In some scenarios, a database may be used to store an exemplary number of vehicles in the field that employ technology "A" and technology "B." Therefore, based on this stored information a determination may be made, e.g., a regulatory decision may be made to determine how a TDM timeframe should be divided. This scenario describes a static TDM configuration.

In scenarios employing static TDM configurations, technologies may change or improve, or new technologies may be introduced. Thus, it would be expected that the balance between the two technologies could change. For instance, in some deployment scenarios, e.g., in Europe, efficient use of the spectrum is a driving requirement, requested by regulators. Thus, a static TDM configuration may lead to channel underutilization.

Therefore, techniques are provided to divide time slots in a way that reflects traffic conditions of respective technologies in a less static manner. Techniques that take changing requirements into consideration may be referred to as semi-static TDM configurations.

In a semi-static configuration, a TDM pattern may be updated from time to time, or periodically, in accordance with information that suggests updates should be made e.g. to match the traffic of specific technologies, or in some cases over certain geographical areas. A network may measure over time, how much traffic is served by technology "A" and how much traffic is served by technology "B." It may be determined, for example that users of technology "B" have increased. Here, the network may determine how to appropriately allocate or distribute the time between the two technologies. In examples, a slot boundary between two technologies may be changed or updated, e.g. offline through a software update to accommodate changing equipment rate.

In examples, TDM configuration updates may be driven by traffic measurements performed by base stations and or roadside units (RSUs) and or other vehicle on board units (OBUs). In aspects, updates may be driven by yet other measurements.

In examples, TDM updates may be driven based on information provided in a database. The database may store information indicating the number of users that currently use each respective technology. In some examples, the database may be used to track long term technology penetration. In examples, distribution over a geographical area of interest may be tracked. In examples other techniques are employed. In some examples, each technology may receive information about current equipment rate and adapt a slot boundary accordingly.

In disclosed examples, considerations are made for in-coverage operation ensuring reliable traffic measurements so that TDM configurations accurately capture technology distributions. In one scenario, assuming roadside units provide coverage for every road, and users are always in range of base stations then it would be sufficient to assume base stations and roadside units are capable of determining TDM configurations and delivering this information to users in an on time manner. In other words, the network may obtain TDM configuration based on information available at the network, and this information is delivered to user devices as soon as possible. Doing so avoids a scenario where a device has an outdated TDM configuration and ends up transmitting on a slot that is no longer available by the actual TDM configuration (this results in collisions on the network). In some examples, UE measurements may be utilized, e.g. UE measurements may be performed or transferred to the network and utilized for updates.

In aspects, for in-coverage operation, TDM configuration updates may be broadcast via signaling from base stations and or RSUs. In examples, broadcasting may refer to a simultaneous transmission of a message from a transmitter to multiple endpoints or receivers in a network. Thus, when all vehicles in an area of interest are in network coverage, traffic measurements may be reliably performed by the network (e.g. base station and or RSUs), and on time delivery of TDM updates may be assumed. In some examples, updates may be sent out-of-band e.g. via cellular network connectivity. In examples, all vehicles receive during a full superframe, except while transmitting. This may be used to detect transmissions from vehicles that are out of coverage.

However, in areas with poor network coverage, this may not be the case. In out of coverage scenarios, there is no network to measure traffic or provide an update of TDM configurations. Thus, disclosed examples provide methods and apparatus for determining and ensuring on time delivery of TDM configuration updates in out of coverage areas.

In some examples a TDM configuration received from the network may have assigned, an indication of a configuration expiration timer. Therefore, if a vehicle receives a TDM configuration, it can safely assume that this TDM configuration would be applicable up to the expiration of the timer. In other words, every TDM configuration update sent by the network (e.g., RSU) is considered valid for a period of time indicated by the value the timer. In examples, this parameter may be TDM_config_expiration_time. The validity of the TDM_config_expiration_time applies even when the OBU goes out of network coverage.

In examples, when the TDM_config_expiration_time of the last received TDM configuration expires, and no new updates have been received, the OBU may assume that this configuration is no longer valid since application of the now invalid TDM configuration may result in interference. Thus, an OBU may fall back to a default TDM configuration that restricts its transmission (but not receiving) resource pool. The default TDM configuration may be a pre-configured TDM configuration. In some cases, a pre-configured TDM configuration may be a best guess value. Here, a network sets and broadcasts the default configuration based on a best guess. For instance, a default configuration may reflect the technology distribution over a very large region e.g. a country. Locally, this distribution may be different, and therefore another TDM configuration may be optional, but it may be preferred to use that as the default.

In examples an OBU may observe assigned timeslots for a period of time to get an idea of TDM configuration to use. For instance, in the example of FIG. 3 in the first seven slots, there may be detected more energy coming from technology "A." Therefore, the OBU may assume the first seven slots are assigned to technology "A" and the last 3 slots are assigned to technology "B."

In some examples, until the OBU goes back into coverage and receives a new TDM configuration, the OBU may perform energy sensing over all slots in order to adapt its TX resource pool according to the traffic load experienced by each technology.

Additionally TDM configuration updates sent by the network (e.g., RSU) may optionally contain geographical area information. This information may indicate a geographical area where the TDM configuration is valid. Whereas a TDM configuration expiration timer may determine the period of time for which an OBU may adhere to a TDM configuration, geographical information may be used to determine geographical area for with the TDM configuration is valid.

In examples, when the geographical area is left or departed from, when the TDM_config_expiration_time of the last received TDM configuration expires, the OBU assumes that this configuration is no longer valid.

In disclosed examples, when an OBU has no valid TDM configuration from the network, it may fall back to a default TDM configuration. In aspects, the default TDM configuration restricts only the slots over which the OBU may transmit. The TDM configuration would not make any restrictions regarding the slots over which a device may listen since, if a receiver decides to listen in all slots, there would be no resulting interference or risk of collision.

In examples of fallback TDM configuration, an OBU may track all slots for transmissions of interest (as if no TDM was applied), since the current (and unknown) TDM might as well provide all slots to the same technology. Here, the OBU may end up receiving signals over slots that are excluded from its TX resource pool.

In examples, a fallback TDM configuration may be determined based on matching the distribution or penetration of technologies in the field over a large-scale geographical area. For instance, it may be known that one half of the population uses technology "A" and the other half the population uses technology "B." Thus, it may be reasonable to set a fallback TDM configuration to split resources equally (e.g., 50-50) between technologies. In some examples, it may be desired not to favor one technology over another technology, the TDM configuration may be based on such distribution considerations. In some examples, a conservative reservation may be used whereby only a small percentage of slots are used for transmission. For example, using a conservative reservation, it may be determined to transmit in only a certain percentage of all slots (e.g., on 20% of slots). This may be done to avoid the possibility of transmitting in a slot reserved for the other technology.

In some aspects, this may have the potential cost of underutilization of resources. In some cases, in order to compensate for potential underutilization using a fallback position, a TDM configuration may be adjusted using energy sensing techniques.

In examples, TDM configuration may be updated via energy sensing. With no restrictions on the RX resource pool, the OBU is able to measure the energy of signals originating from the two technologies for each slot. For example, an LTE-V2X OBU can listen to all slots, and over a period of time have a good understanding of which of these slots are mostly occupied by LTE signals, which of the slots are mostly occupied by DSRC. That is, an OBU may listen in every slot and come up with a mapping of the slots to technologies according to the levels of energy that is sensed from these technologies on a given slot. Based on this info, each UE on its own, updates the TDM configuration according to what has been detected.

In disclosed examples, an LTE-V2X OBU measures reference signal received power (RSRP) of LTE signals and received signal strength indicator (RSSI) out of which the signal power of ITS-G5 signals is computed. In some examples, an ITS-G5 OBU performs preamble detection of ITS-G5 signals and RSSI thus obtaining signal powers of ITS-G5 and LTE-V2X. As used herein, RSRP refers to energy of signals of the same technology and RSSI refers to overall energy.

In aspects, these measurements may be performed over a preconfigured time interval and are averaged. The OBU uses these measurements to decide (e.g., by comparing to a threshold) whether to include or exclude TDM slots from its current TDM configuration. Various possibilities exist on how this update may be performed. Disclosed examples include a method for sequential updates as described below.

In aspects, disclosed energy sensing methods may be employed as standalone for generating a TDM configuration, even in the case when no assistance from the network is available (either due to poor coverage or for signaling overhead reduction purposes)

In aspects, disclosed energy sensing methods may also be employed even under (partial) coverage conditions since the OBU energy sensing provides in principle a more accurate description of the traffic conditions experienced in the field compared to the remote measurements performed by the network (e.g., RSU)

In aspects, disclosed energy sensing methods may be implemented as an additional feature on top of the configuration update mechanism from RSU and out-of-coverage fall back mechanism, i.e. the two mechanisms are not mutually exclusive.

Figure 3C:
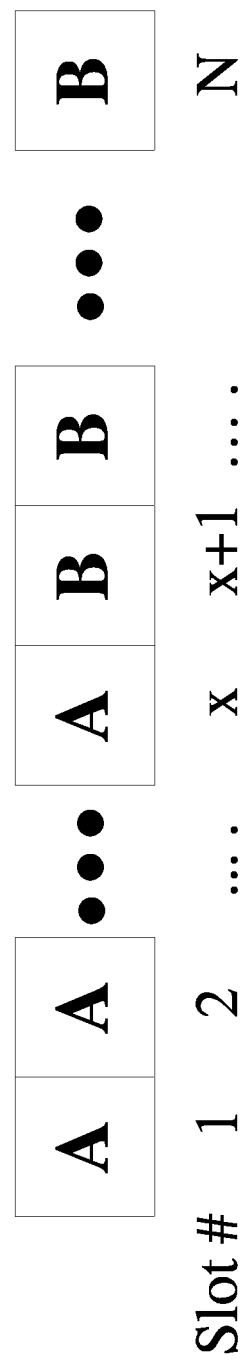
FIG. 3C illustrates an example of disclosed embodiments.

FIG. 3C illustrates an example sequential update method for TDM configuration adaptation for an LTE-V2X apparatus. As illustrated, an LTE-V2X (technology "A") OBU falls back to the default TDM configuration. In this example, x=5 for a fair default TDM configuration. In this example, x may be arbitrary. As illustrated, the first "x" slots are assigned to technology "A" by the default configuration and the remaining ones are assigned to technology "B." In this example, N slots per frame are considered. Here, the OBU sequentially updates its TDM configuration as follows:

At step i (=1, 2, . . . ), let the slots assigned to technology "A" by the OBUs local TDM configuration range from 1 to x. RSRP and RSSI measurements are performed for all slots (1 to N) over a preconfigured time interval and are combined (averaged) with previous ones (moving average window). The averaged energies are compared against a threshold and one of the following decisions is made:

Slot x+1 is included in the technology "A" slots
Slot x is removed from the technology "A" slots
No change is made to the TDM configuration
OBU proceeds to step i+1 with x updated to the number of slots dedicated to technology "A" after conclusion of step i.

Disclosed examples require very few or no additional modifications to existing LTE/NR-V2X standards. On the other hand, existing time sharing approaches propose modification to existing LTE/NR V2X standards by insertion of additional signals (e.g. ITS-G5 headers as part of the LTE-V2X signal) to allow for other technologies to detect LTE-V2X signals. Furthermore, in scenarios where one technology does not exist (anymore) in one region, the TDM scheme may be easily used to give the full time to the other technology by updating the TDM pattern through RSU and setting very long TDM_config_expiration_time or updating the default configuration. Also, due to network based TDM configuration, the pattern is identical for all vehicles which are in coverage: other approaches solely rely on sensing within each OBU to adapt the pattern autonomously, which might lead to different TDM patterns across OBUs, and collisions.

Figure 4A:
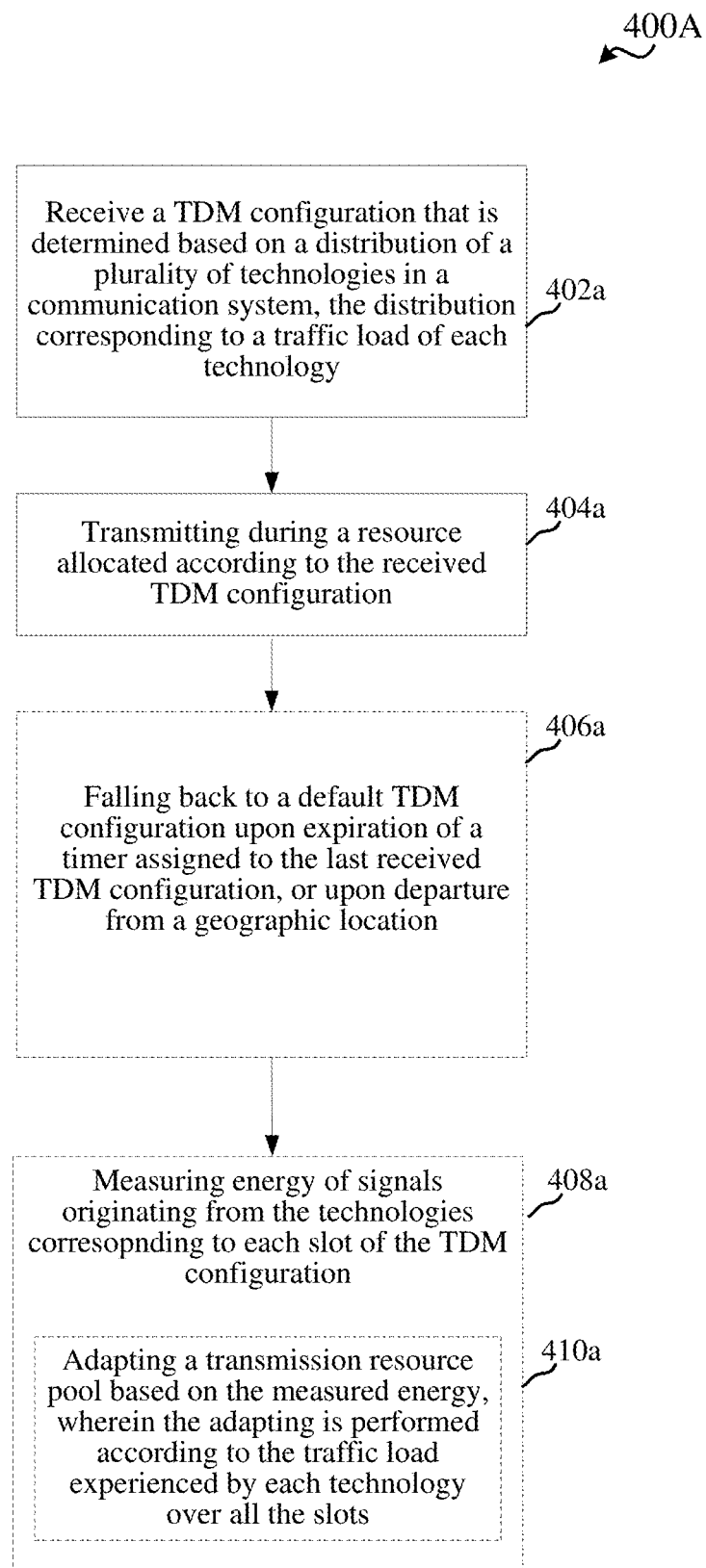
FIG. 4A and FIG. 4B are flow charts illustrating examples of disclosed embodiments.

FIG. 4A illustrates a flow chart of examples of method 400A for TDM-based co-existence of V2X technologies. In an example, a UE 104 may perform the functions described in method 400A using one or more of the components described in FIGS. 1-2, such as communicating component 142 and/or its subcomponents. In method 400A, at block 402a, a user equipment or vehicle OBU may receive a time division multiplexed configuration that is determined based on a distribution of a plurality of technologies in a communication system, the distribution corresponding to a traffic load of each technology. At block 404a, the user equipment or OBU may transmit during a resource allocated according to the received TDM configuration. At block 406a, the user equipment or OBU may optionally fall back to a default TDM configuration upon expiration of a timer assigned to a last received TDM configuration. At block 408a, the user equipment or OBU may optionally measure an energy of signals originating from the technologies corresponding to each slot of the TDM configuration and at block 410a, the user equipment or OBU may optionally adapt a transmission resource pool based on the measured energy, wherein adapting is performed according to traffic load experienced by each technology over all slots.

Figure 4B:
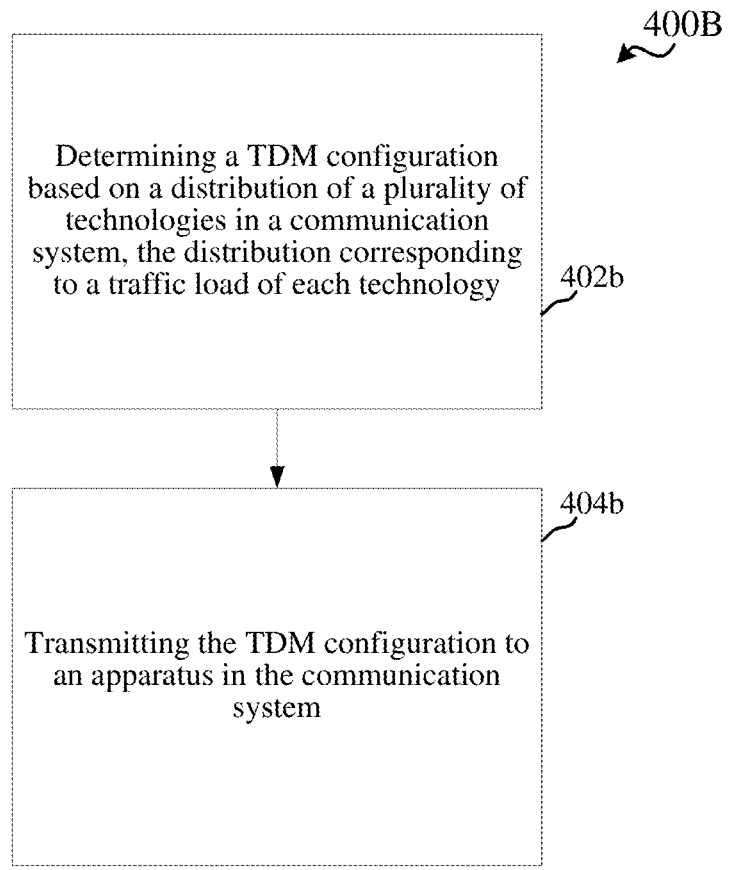

FIG. 4B illustrates a flow chart of examples of method 400B for TDM-based co-existence of V2X technologies. In an example, a BS 102 may perform the functions described in method 400B. In method 400B, at block 402b, a network device or base station may determine a TDM configuration based on a distribution of a plurality of technologies in a communication system, the distribution corresponding to a traffic load of each technology. At block 404B, the base station or network may transmit the TDM configuration to an apparatus in the communication system.

Figure 5:
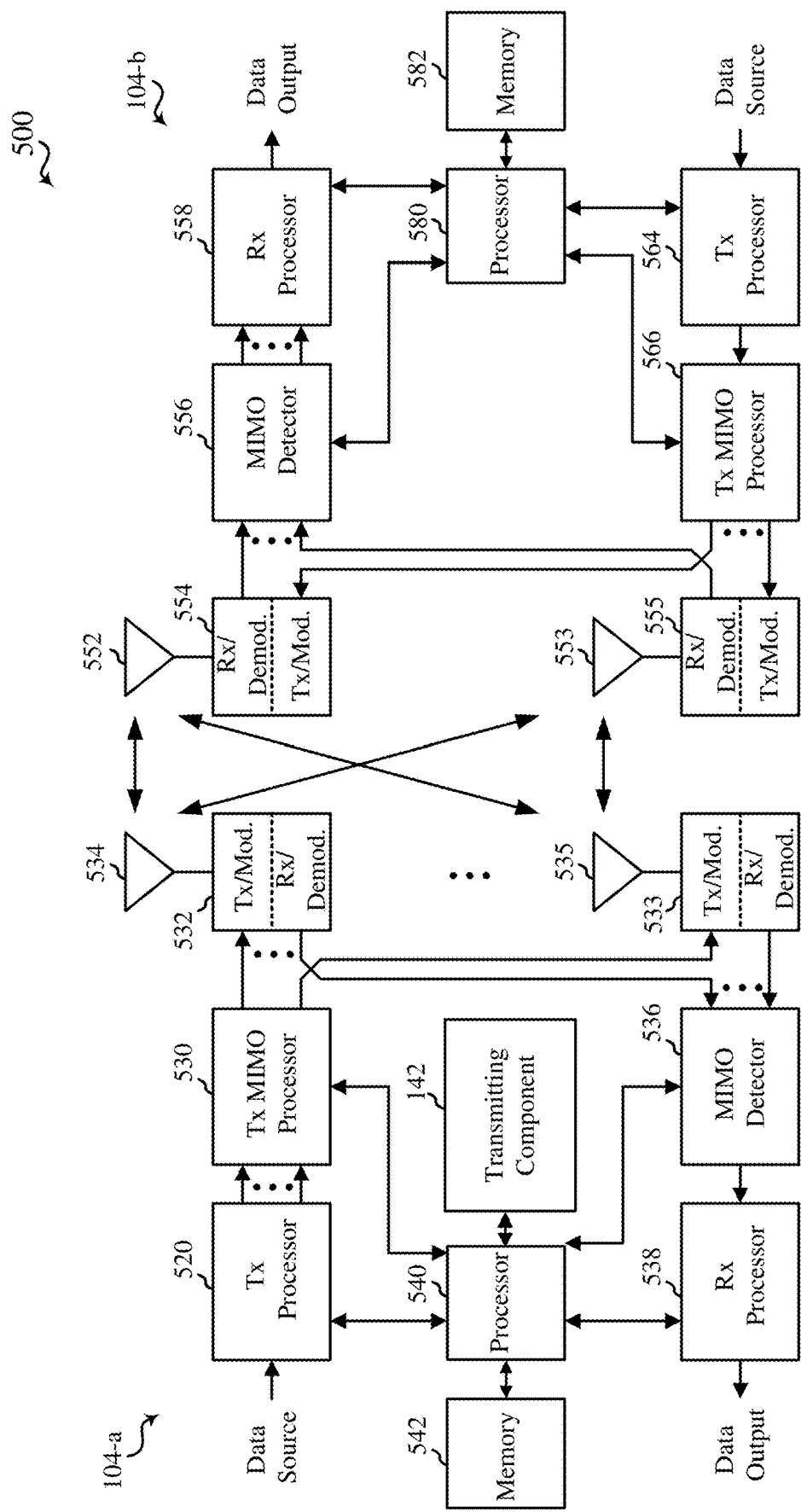
FIG. 5 is a block diagram illustrating an example of a MIMO communication system including a base station and a UE, in accordance with various aspects of the present disclosure.

FIG. 5 is a block diagram of a MIMO communication system 500 including UEs 104-a, 104-b. The MIMO communication system 500 may illustrate aspects of the wireless communication access network 100 described with reference to FIG. 1. The UE 104-a may be an example of aspects of the UE 104 described with reference to FIGS. 1-2. The UE 104-a may be equipped with antennas 534 and 535, and the UE 104-b may be equipped with antennas 552 and 553. In the MIMO communication system 500, the UEs 104-a, 104-b may be able to send data over multiple communication links at the same time. Each communication link may be called a "layer" and the "rank" of the communication link may indicate the number of layers used for communication. For example, in a 2×2 MIMO communication system where UE 104-a transmits two "layers," the rank of the communication link between the UE 104-a and the UE 104-b is two.

At the UE 104-a, a transmit (Tx) processor 520 may receive data from a data source. The transmit processor 520 may process the data. The transmit processor 520 may also generate control symbols or reference symbols. A transmit MIMO processor 530 may perform spatial processing (e.g., precoding) on data symbols, control symbols, or reference symbols, if applicable, and may provide output symbol streams to the transmit modulator/demodulators 532 and 533. Each modulator/demodulator 532 through 533 may process a respective output symbol stream (e.g., for OFDM, etc.) to obtain an output sample stream. Each modulator/demodulator 532 through 533 may further process (e.g., convert to analog, amplify, filter, and upconvert) the output sample stream to obtain a DL signal. In one example, DL signals from modulator/demodulators 532 and 533 may be transmitted via the antennas 534 and 535, respectively.

The UE 104-b may be an example of aspects of the UEs 104 described with reference to FIGS. 1-2. At the UE 104-b, the UE antennas 552 and 553 may receive the signals from the UE 104-a (e.g., over a sidelink) and may provide the received signals to the modulator/demodulators 554 and 555, respectively. Each modulator/demodulator 554 through 555 may condition (e.g., filter, amplify, downconvert, and digitize) a respective received signal to obtain input samples. Each modulator/demodulator 554 through 555 may further process the input samples (e.g., for OFDM, etc.) to obtain received symbols. A MIMO detector 556 may obtain received symbols from the modulator/demodulators 554 and 555, perform MIMO detection on the received symbols, if applicable, and provide detected symbols. A receive (Rx) processor 558 may process (e.g., demodulate, deinterleave, and decode) the detected symbols, providing decoded data for the UE 104-b to a data output, and provide decoded control information to a processor 580, or memory 582.

At the UE 104-b, a transmit processor 564 may receive and process data from a data source. The transmit processor 564 may also generate reference symbols for a reference signal. The symbols from the transmit processor 564 may be precoded by a transmit MIMO processor 566 if applicable, further processed by the modulator/demodulators 554 and 555 (e.g., for SC-FDMA, etc.), and be transmitted to the UE 104-a in accordance with the communication parameters received from the UE 104-a. At the UE 104-a, the signals from the UE 104-b may be received by the antennas 534 and 535, processed by the modulator/demodulators 532 and 533, detected by a MIMO detector 536 if applicable, and further processed by a receive processor 538. The receive processor 538 may provide decoded data to a data output and to the processor 540 or memory 542.

The processor 540 may in some cases execute stored instructions to instantiate a communicating component 142 (see e.g., FIGS. 1 and 2).

The components of the UEs 104-a, 104-b may, individually or collectively, be implemented with one or more application specific integrated circuits (ASICs) adapted to perform some or all of the applicable functions in hardware. Each of the noted modules may be a means for performing one or more functions related to operation of the MIMO communication system 500. Similarly, the components of the UE 104-a may, individually or collectively, be implemented with one or more ASICs adapted to perform some or all of the applicable functions in hardware. Each of the noted components may be a means for performing one or more functions related to operation of the MIMO communication system 500.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices. e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray R disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication, the method comprising:
    receiving a time division multiplexed (TDM) configuration that is determined based on a distribution of a plurality of technologies in a communication system, the distribution corresponding to a traffic load of each technology;
    transmitting in accordance with channel access methods of one of the plurality of technologies during a resource allocated according to the received TDM configuration; and
    falling back from the received TDM configuration to a default TDM configuration based on expiration of a timer assigned to the received TDM configuration or based on departure from a geographic location.

2. The method of claim 1, wherein each of the plurality of technologies operate in accordance with channel access methods defined for each technology.

3. The method of claim 1, wherein the received TDM configuration is valid for transmissions.

4. The method of claim 3, further comprising listening to all slots to determine whether the default TDM configuration is matched to an actual TDM configuration.

5. A method of wireless communication, the method comprising:
    receiving a time division multiplexed (TDM) configuration that is determined based on a distribution of a plurality of technologies in a communication system, the distribution corresponding to a traffic load of each technology of the plurality of technologies, wherein each respective technology of the plurality of technologies operates in accordance with one or more channel access methods defined for the respective technology, the received TDM configuration indicating a number of slots per frame that correspond to at least one technology of the plurality of technologies;
    measuring, in each slot per frame, an energy of signals originating from the plurality of technologies;
    adapting a transmission resource pool based on the energy of the signals in each slot per frame, wherein the adapting is performed according to the traffic load of each of the plurality of technologies over each slot per frame; and
    transmitting in accordance with the one or more channel access methods defined for one of the plurality of technologies and in accordance with the adapted transmission resource pool.

6. The method of claim 5, further comprising measuring, by a Long Term Evolution (LTE)-vehicle-to-anything (V2X) on board unit (OBU), reference signal received power (RSRP) of LTE signals and received signal strength indicator (RSSI) of intelligent transport system (ITS)-G5 signals over each slot per frame.

7. The method of claim 5, further comprising:
    detecting, by an intelligent transport system (ITS)-G5 on board unit (OBU), ITS-G5 signals and received signal strength indicator (RSSI) for Long Term Evolution (LTE)-vehicle-to-anything (V2X) over each slot per frame.

8. The method of claim 5, wherein the measuring, in each slot per frame, the energy of the signals comprises measuring the energy of the signals, in each slot per frame, over a pre-configured time interval; and the method further comprising averaging the measurements of the energy of the signals in each slot per frame over the pre-configured time interval.

9. The method of claim 5, further comprising:
comparing the averaged measurements of the energy of the signals in each slot per frame to a threshold; and
determining whether to include or exclude TDM slots from the received TDM configuration based on the comparison.

10. The method of claim 1, wherein the default TDM configuration is based on matching a distribution of technologies over a geographical area.

11. The method of claim 1, wherein the default TDM configuration is based on splitting resources.

12. The method of claim 11, wherein the resources are split equally.

13. The method of claim 1, wherein the default TDM configuration is based on a conservative reservation.

14. An apparatus for wireless communication, the apparatus comprising:
a memory comprising executable instructions;
a processor configured to, or multiple processors configured to collectively, execute the executable instructions and cause the apparatus to:
receive a time division multiplexed (TDM) configuration that is determined based on a distribution of a plurality of technologies in a communication system, the distribution corresponding to a traffic load of each technology of the plurality of technologies, wherein each respective technology of the plurality of technologies operates in accordance with one or more channel access methods defined for the respective technology, the received TDM configuration indicating a number of slots per frame that correspond to at least one technology of the plurality of technologies;
measure, in each slot per frame, an energy of signals originating from the plurality of technologies;
adapt a transmission resource pool based on the energy of the signals in each slot per frame, wherein the adapting is performed according to the traffic load of each of the plurality of technologies over each slot per frame; and
transmit in accordance with the one or more channel access methods defined for one of the plurality of technologies and in accordance with the adapted transmission resource pool.

15. An apparatus for wireless communication, the apparatus comprising:
a memory comprising executable instructions;
a processor configured to, or multiple processors configured to collectively, execute the executable instructions and cause the apparatus to:
receive a time division multiplexed (TDM) configuration that is determined based on a distribution of a plurality of technologies in a communication system, the distribution corresponding to a traffic load of each technology;
transmit in accordance with channel access methods of one of the plurality of technologies during a resource allocated according to the received TDM configuration; and
fall back from the received TDM configuration to a default TDM configuration based on expiration of a timer assigned to the received TDM configuration or based on departure of the apparatus from a geographic location.

* * * * *